Inventors:
R. Heidecke
H. Bretthauer
J. Mädge
By Charles Shepard
Attorney

2,869,396

HOLDING MEANS FOR CAMERA SHUTTER SETTING KNOBS

Reinhold Heidecke, Hermann Bretthauer and Joachim Mädge, Braunschweig, Germany, assignors to Franke & Heidecke, Fabrik Photographischer Prazisions-Apparate, Braunschweig, Germany, a German firm Application June 5, 1953, Serial No. 359,832

Claims priority, application Germany June 9, 1952

5 Claims. (Cl. 74—528)

This invention relates to photographic shutters, more especially the shutters used on cameras of the twin lens reflex type, and deals particularly with mechanism for holding the shutter adjusting parts against accidental movement, while permitting easy and quick adjusting movements when desired.

An object of the invention is the provision of generally improved and more satisfactory means for holding the shutter adjusting parts against undesired movement.

Another object is the provision of simple and effective holding or latching mechanism so designed that it may be released by finger pressure of the same finger used to turn or adjust the shutter setting parts.

Another object of the invention is the provision of such holding or latching mechanism so designed that the finger pressure required to release the latch or holding means is less than the braking force or holding force.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
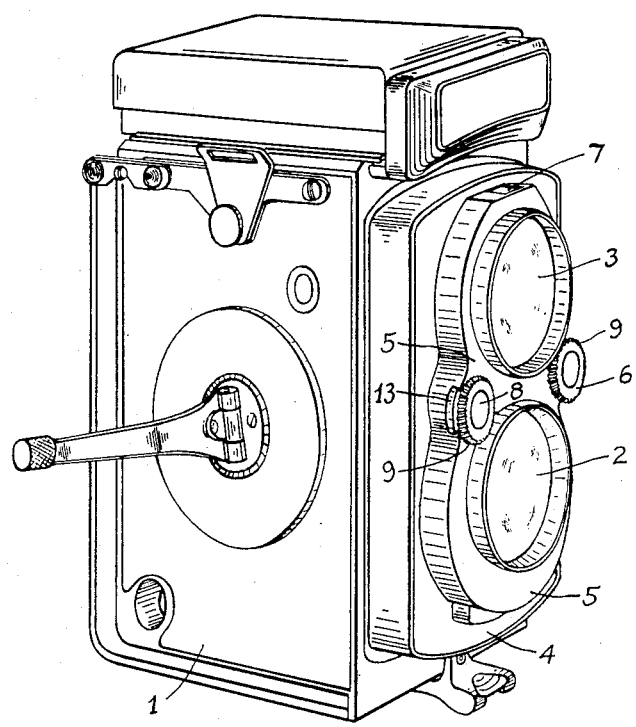
Fig. 1 is a perspective view of a photographic camera equipped with mechanism in accordance with one embodiment of the present invention.

Referring first to Fig. 1, there is shown here a twin lens reflex camera of a type which (except for the details of the present invention) is widely known and well understood in the art. This camera includes a main body 1, a picture taking lens 2, a view finder lens 3, and a lens board or camera front member 4 on which the lenses 2 and 3 are mounted, this lens board 4 being movable forwardly and backwardly for focusing purposes, by means of a focusing knob customarily mounted on the left side wall of the camera, which is accordingly hidden from view in Fig. 1.

A shutter of the objective type or between-the-lens type is mounted at the lens 2 and, together with its adjusting mechanism and associated parts, is enclosed within the housing or casing 5. Except for the holding or latching means of the present invention, the shutter may be of the kind heretofore commonly used with cameras of this type, and well understood in the art. When the shutter is opened, light enters through the lens 2 and passes into the main exposure chamber in the lower part of the camera casing 1, to expose the film therein. Light also enters through the finder lens 3 (which has no shutter) and passes into the focusing chamber in the upper part of the camera body, and falls upon a focusing screen (ground glass or the like) on which the sharpness of the image can be seen when the focusing hood at the top of the camera is opened to normal viewing position. In Fig. 1, the conventional focusing hood is shown in collapsed or folded position.

The shutter of the lens 2 is provided with the usual two adjustments, one being the shutter speed adjustment operated by rotating the knob 6, the other being the aperture adjustment or iris diaphragm adjustment, controlled by turning the knob 8. Except for the means for holding the knobs 6 and 8 against accidental turning movement, the construction may be of the conventional kind already familiar to users of cameras of this type, the knobs 6 and 8 being connected by the usual conventional gearing connections to the shutter speed setting ring and the iris diaphragm setting ring. Also, in the usual manner, the turning of the knobs 6 and 8 serves to move scale rings or index rings visible through the window 7 at the top of the housing or casing 5, so that the user of the camera, holding the camera at chest level or waist level, can look downwardly onto the top of the housing 5 and see, through the window 7, the speed for which the shutter is set and the aperture or diaphragm opening for which the shutter is set.

A camera of this type is designed so that it may be used, when desired, for taking a series of pictures in rapid succession. The large crank on the right hand side wall of the camera body serves, in known manner, to tension the shutter and feed the film forward through one exposure space or "frame" upon only a partial revolution of this crank. In the handling of the camera during an attempt to make a rapid series of successive pictures, the operator's finger may easily come into accidental contact with one or the other of the adjusting knobs 6 and 8, and might accidentally change the setting without the operator realizing it. When the operator is attempting to take pictures rapidly, he may forget to look or have no time to look into the window 7 in order to check the shutter setting just before making each exposure. Therefore it is highly desirable to provide means for holding the adjusting knobs 6 and 8 fast against accidental turning; yet the holding means must be so simple that it can be operated rapidly and easily by the operator when he does desire purposely to change the shutter adjustment. This is accomplished by the present invention.

For ease of turning by slight finger pressure, both of the knobs 6 and 8 are provided on their exposed peripheries with fairly deep knurling or teeth 9 for better frictional engagement with the operator's finger. The holding means or latching means for each knob is identical with that used for the other knob, so a description of one will suffice for both.

Figure 3:
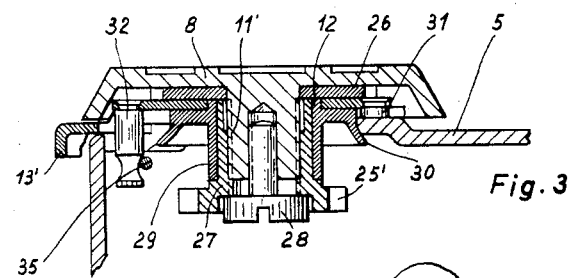
Fig. 3 is a section taken substantially on the line 3—3 of Fig. 2.
Figure 2:
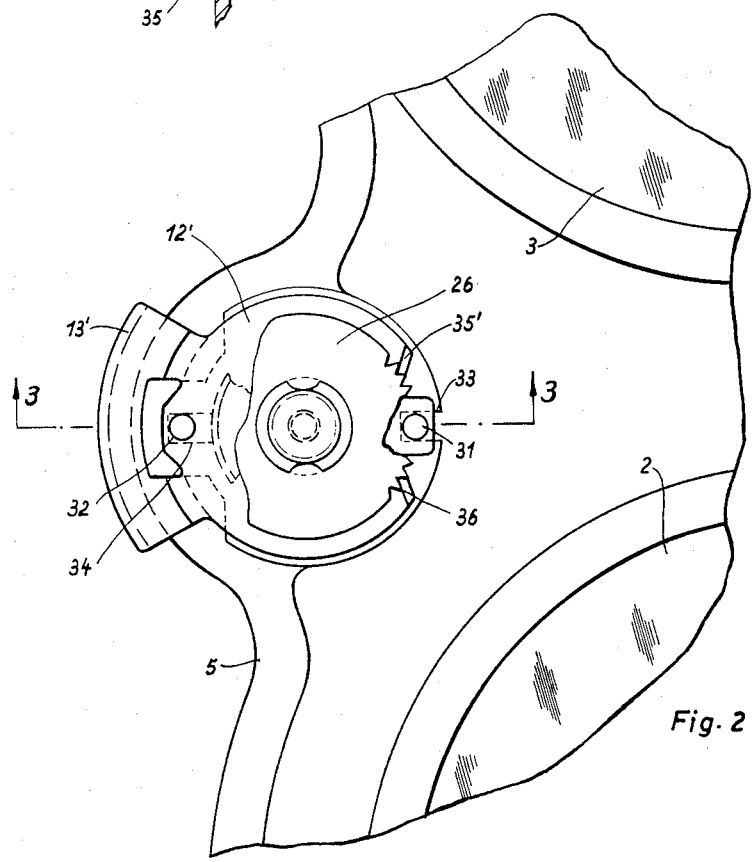
Fig. 2 is a fragmentary face view of a portion of the camera shown in Fig. 1, showing additional details of the construction.

Referring now to the preferred embodiment of the invention, as illustrated in Figs. 2 and 3, the shutter casing is shown at 5 and the adjusting knob at 8. In this instance, the adjusting knob 8 has an annular recess in its inner face, and in this recess is a ratchet wheel or toothed wheel 26, the teeth of which, as seen in Fig. 2, are of approximately triangular shape, and so placed that there will be two teeth, somewhat separated from each other, which have their opposite edges or flanks substantially parallel to each other.

A bushing or sleeve 27, screwed onto the central stud or stub shaft 11, of the adjusting knob, and held in place by the screw 28, presses at its forward end against the ratchet wheel 26 to hold this ratchet wheel firmly in fixed position relative to the adjusting knob 8. This bushing 27 carries the spur gear 25' which is connected through other suitable gearing of known form to the shutter speed adjusting parts or the iris diaphragm adjusting parts, as the case may be.

The slide 12' extends approximately diametrically with respect to the adjusting knob 8, and projects radially a little beyond the periphery of the knob 8 and has its outer edge turned down angularly at 13' to provide a larger bearing surface for the finger of the operator. A portion of this slide 12' lies against the rear face of the ratchet wheel 26, and is held between this ratchet wheel and a second sleeve 29 which surrounds the sleeve 27 and which has a conical flange 30 engaging the casing 5. The slide 12' is guided for radial movement and prevented from turning, by means of two pins 31 and 32 fixed to the slide 12' and projecting rearwardly from the under face thereof, which pins engage in radial slots 33 and 34 in a fixed part. The pin 32 is lengthened to extend further rearwardly, and is engaged by a spring 35 which constantly presses in a leftward direction when viewed as in Figs. 2 and 3.

Near the right hand end of the slide 12', the slide is formed with forwardly projecting teeth 35' and 36, for engagement with the teeth of the ratchet wheel 26. It will be noted from Fig. 2 that the two teeth 35' and 36 are so shaped that the edges thereof which are faced toward each other are substantially parallel to each other, so that these edges or flanks of the teeth will engage with the above mentioned parallel flanks or sides of the teeth on the ratchet wheel 26. The other sides of the locking teeth 35' and 36 are arranged at such angles that they will lie snugly against the inclined sides of the next adjacent ratchet wheel teeth, as seen in the drawing.

In operation, when the operator desires to change the adjustment of the shutter, he presses his finger laterally against the exposed end 13' of the slide 12', moving this end of the slide inwardly toward the center of the adjusting knob 8, against the force of the spring 35. This movement of the slide 12' carries the teeth 35' and 36 rightwardly (when viewed as in Fig. 2) out of contact with the teeth of the ratchet wheel 26. The operator then moves his finger longitudinally in one direction or the other, while maintaining the lateral pressure, so that the finger engages the adjusting knob 8 and turns it to the required extent. Upon completion of adjustment, the operator releases the finger pressure, the spring 35 moves the slide 12' leftwardly to its initial locking position, and the locking teeth 35' and 36 on the slide engage with the teeth on the ratchet wheel 26, locking the ratchet wheel and the adjusting knob 8 against accidental turning.

In the embodiment illustrated, the operation is performed by a slide mounted for rectilinear movement. It will be apparent, however, that the same principles can be applied when using a lever mounted for pivotal movement, rather than a slide. A slide can be considered as the equivalent of a lever having its pivot at an infinite distance from the place of contact with the operator's finger, or a lever may be considered as the equivalent of a slide having a pivot point at a finite distance.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter adjusting assembly including a setting knob, a latch operating member normally projecting radially beyond the periphery of the knob and mounted for movement approximately radially with respect to said knob so that the outer end of said operating member may be pressed radially inwardly toward the knob by a finger simultaneously engaging the knob to turn the same, and latching means normally holding said knob against turning movement, said latching means including a ratchet wheel fixed relative to said knob and locking teeth on said operating member adapted to engage with said ratchet wheel, the teeth of said ratchet wheel having approximately triangular shape and said locking teeth each having a side which is approximately parallel to the side of a ratchet tooth with which it engages, said operating member adapted to release said latching means when said operating member is pressed radially inwardly.

2. A photographic shutter adjusting assembly including a setting knob, a latch operating slide mounted for movement with respect to said knob, a ratchet wheel fixed relative to said knob and having a plurality of teeth of triangular shape, a latch part mounted for movement into and out of engagement with said ratchet wheel to hold said knob against turning movement when said latch part is engaged therewith, said latch part including a pair of locking teeth operatively connected to said slide, said locking teeth having their confronting sides arranged approximately parallel to each other and adapted to engage with similar sides on said ratchet wheel, and a spring tending to move said latch part into engagement with said ratchet wheel and to move said operating slide to project one end thereof outwardly beyond the periphery of said knob to a position where the projecting end of said slide may be engaged by a finger and moved inwardly to release said latch part from said ratchet wheel to allow turning movement of said knob.

3. An adjusting assembly for a photographic camera, said assembly including a casing having a corner formed by a front wall and a side wall at substantially a right angle to each other, a rotary adjusting knob projecting forwardly from said front wall close to said side wall with one side of the periphery of said knob approximately alined with said side wall and with serrations on said periphery, a toothed ratchet lying behind said knob and fixed thereto to turn therewith, a movable latch member lying behind said knob and having an operating end projecting slightly beyond said side wall of said casing and beyond the corresponding side of the periphery of said knob, said latch member being movable to project to a greater or lesser extent beyond said side wall and said periphery, a spring urging said latch member to project to its maximum extent, and a part on said latch member for engaging teeth of said ratchet to hold said ratchet and knob against rotation when said latch member projects beyond said side wall to its maximum extent, said part being withdrawn from said ratchet teeth to permit rotation of said ratchet and knob when said latch member is displaced inwardly from its maximu projected position, the parts being so proportioned and arranged that when one finger of an operator is moved along said side wall of the casing in a direction tangentially to said knob, said one finger may simultaneously displace said latch member inwardly and engage the serrations on the periphery of said knob to rotate the same while maintaining inward displacing pressure on said latch member.

4. A construction as defined in claim 3 in which said knob has a central shaft extending rearwardly through said front wall of said casing and in which the rear face of said knob is annularly recessed around said shaft and in which said ratchet surrounds said shaft and lies in the recess in the rear face of said knob, further including a sleeve surrounding said shaft rearwardly of said ratchet, said sleeve having gear teeth formed thereon and adapted to mesh with a geared part to be adjusted by rotation of said knob, and a screw threaded axially into the rear end of said shaft and having a head overlapping said sleeve and exerting forward pressure on said sleeve to cause the sleeve in turn to press forwardly on said ratchet to hold the parts in assembled relation to each other.

5. A construction as defined in claim 3, in which the part of said latch member engaging said ratchet teeth comprises two engagement portions spaced from each other in a direction circumferentially of the ratchet for engaging two non-adjacent ratchet teeth simultaneously, the ratchet teeth being so shaped that the sides thereof which are engaged by said portions of said latch member are the sides which are remote from each other and are arranged substantially parallel to each other and substantially parallel to the direction of movement of said latch member.

References Cited in the file of this patent

UNITED STATES PATENTS

| | | |
|---|---|---|
| 848,604 | Reimers | Mar. 26, 1907 |
| 1,368,394 | Guthrie | Feb. 15, 1921 |
| 1,461,521 | Forney et al. | July 10, 1923 |
| 1,486,721 | Bennett | Mar. 11, 1924 |
| 1,533,155 | Zitterbart | Apr. 14, 1925 |
| 1,860,418 | Hummert | May 31, 1932 |
| 2,110,989 | Erickson | Mar. 15, 1938 |
| 2,435,857 | Werner | Feb. 10, 1948 |

FOREIGN PATENTS

| | | |
|---|---|---|
| 220,855 | Great Britain | Aug. 11, 1924 |